J. W. COLBURN.
Implements for Destroying Cut-Worms.

No. 152,339. Patented June 23, 1874.

Witnesses:
W. Willard Bowles
John H. Christman

Inventor:
James W. Colburn
by F. A. Morsly
Atty.

UNITED STATES PATENT OFFICE.

JAMES W. COLBURN, OF ROSE, NEW YORK.

IMPROVEMENT IN IMPLEMENTS FOR DESTROYING CUT-WORMS.

Specification forming part of Letters Patent No. 152,339, dated June 23, 1874; application filed June 9, 1874.

*To all whom it may concern:*

Be it known that I, JAMES W. COLBURN, of Rose, in the county of Wayne and State of New York, have invented an Improved Implement for Destroying Cut-Worms, of which the following is a specification:

This invention relates to a vehicle for making sharp grooves in the ground on each side of a row of plants, into which the cut-worms fall during the night and are detained until the sun comes upon them and kills them.

The invention consists in a vehicle with a vertically-adjustable frame, in which is suspended a transverse shaft, and on this shaft are fixed two or more wheels, that run upon the surface of the ground, each wheel having a wedge-shaped rib around its entire periphery, that is forced into the ground as the vehicle advances, and makes a sharp groove, as before described.

Figure 1:
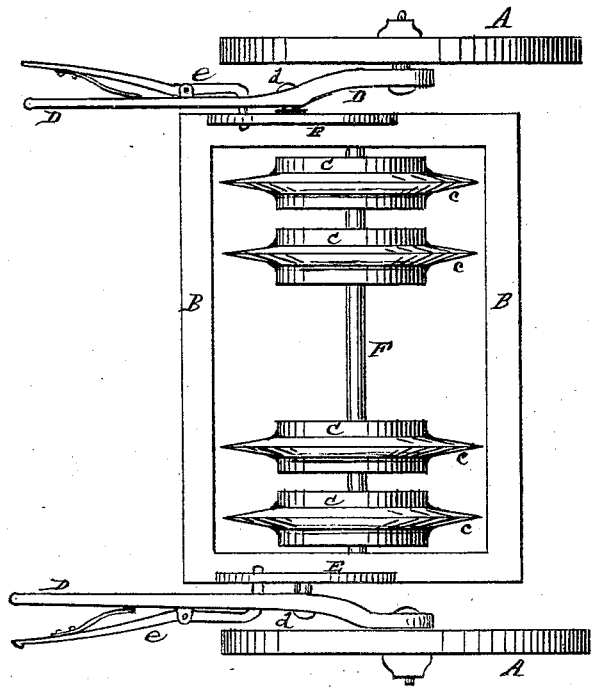
Figure 2:
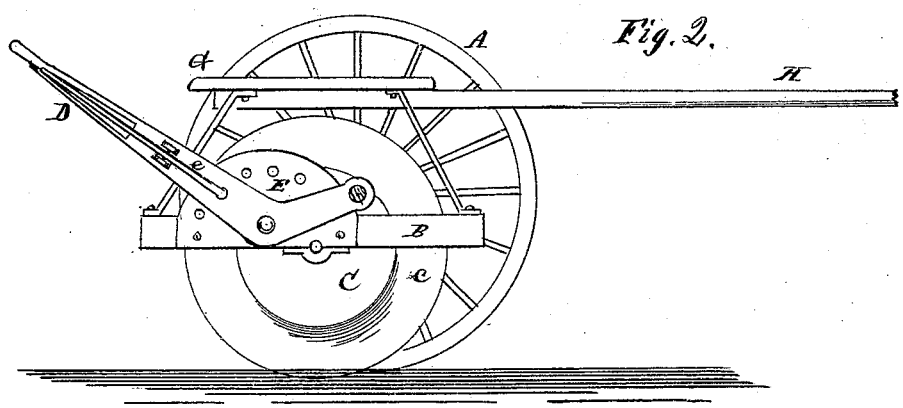

Figure 1 is a plan with the seat and thills removed. Fig. 2 is a side view with the nearest wheel A omitted.

Similar letters of reference indicate like parts in the separate figures.

B is a frame, that is supported on the wheels A A in a vertically-adjustable manner, and in the frame B is a transverse shaft, F, on which four wheels, C c, are secured. These wheels C have a sharp rib, c, each of them, and these ribs enter the ground and leave a series of deep grooves in the ground. The periphery of each disk C constitutes a continuous shoulder on each side of the rib c. The office of these shoulders is to level and slightly compress the earth at the sides of the channels or grooves formed by the ribs c, thus preventing loose earth from falling in, and making a channel with sharp and well-defined sides and edges. The cut-worms operate wholly at night, and secrete themselves during the day. These worms fall into said grooves, where they are detained until the sun comes upon them, and they are killed by two hours of sun.

The machine, as shown, is constructed to make grooves for two rows of plants at the same time, the two wheels, C C, of either side making grooves on both sides of one row. The wheels C c can be secured on the shaft F by set-screws, so as to be adjusted laterally on said shaft. The supporting-wheels A A of the frame are attached to said frame by crank-levers D, that are pivoted to the frame at *d d*, and these levers are held rigid in the positions in which they are set by a rack, E, and spring-catch *e*, said catch having a suitable handle, as shown. By raising the levers D D the grooving devices are raised entirely clear of the ground.

I claim—

The grooving-disks C, having sharp ribs *c* and shoulders at the sides thereof, in combination with a shaft, F, and frame B, mounted on draft-wheels A A, adjustable by means of levers D, all constructed, arranged, and operating substantially as and for the purpose described.

The above specification of my invention signed by me this 12th day of April, 1872.

JAMES W. COLBURN.

Witnesses:
F. A. MORLEY,
W. WILLARD SOWLES.